(12) United States Patent
Ye et al.

(10) Patent No.: US 10,758,903 B2
(45) Date of Patent: Sep. 1, 2020

(54) MICROFLUIDIC DEVICES FOR MULTI-INDEX BIOCHEMICAL DETECTION

(71) Applicants: CapitalBio Corporation, Beijing (CN); Tsinghua University, Beijing (CN)

(72) Inventors: Jiaming Ye, Beijing (CN); Kaihuan Zhang, Beijing (CN); Wanli Xing, Beijing (CN); Jing Cheng, Beijing (CN)

(73) Assignees: CAPITALBIO CORPORATION, Beijing (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/398,113

(22) PCT Filed: May 7, 2013

(86) PCT No.: PCT/CN2013/000535
§ 371 (c)(1),
(2) Date: Oct. 30, 2014

(87) PCT Pub. No.: WO2013/166857
PCT Pub. Date: Nov. 14, 2013

(65) Prior Publication Data
US 2015/0132753 A1    May 14, 2015

(30) Foreign Application Priority Data

May 7, 2012  (CN) .......................... 2012 1 0138794
May 7, 2012  (CN) .......................... 2012 1 0142337
May 7, 2012  (CN) .......................... 2012 1 0142342

(51) Int. Cl.
*B01L 3/00*       (2006.01)
*F16K 99/00*      (2006.01)

(52) U.S. Cl.
CPC ... *B01L 3/502738* (2013.01); *B01L 3/502707* (2013.01); *F16K 99/0026* (2013.01);
(Continued)

(58) Field of Classification Search
CPC ............... B01L 3/00; B01L 2400/0487; B01L 2400/0655; B01L 3/502738
See application file for complete search history.

(56) References Cited

U.S. PATENT DOCUMENTS

2002/0029814 A1*  3/2002  Unger ............... B01L 3/502707
                                              137/824
2003/0080442 A1*  5/2003  Unger ..................... H01L 21/00
                                              257/787
(Continued)

FOREIGN PATENT DOCUMENTS

WO    WO-2002/081729     10/2002
WO    WO-2007/033385      3/2007
(Continued)

OTHER PUBLICATIONS

Communication pursuant to Rules 161(2) and 162 EPC for EP 13788232.0, dated Jan. 16, 2015, 3 pages.
(Continued)

*Primary Examiner* — Betty J Forman
(74) *Attorney, Agent, or Firm* — Rimon, P.C.

(57) ABSTRACT

In one aspect, a microfluidic device for multiple reactions is provided, which comprises a reaction channel comprising multiple reaction chambers connected to a closed chamber or an elastic balloon outside of the microfluidic device, wherein a wall of the closed chamber is an elastic membrane; and a control channel comprising an elastic side wall, wherein the intersections between the side wall of the control channel with the reaction channel form multiple pneumatic microvalves. In another aspect, a method for
(Continued)

conducting multiple reactions using the microfluidic device is provided, which comprises: a) filling the reaction chambers with a sample; and b) applying pressure to the control channel to expand the elastic side wall of the control channel, wherein the expanded elastic side wall forms a pneumatic microvalve that separates the reaction chambers.

26 Claims, 2 Drawing Sheets

(52) U.S. Cl.
CPC ... *F16K 99/0059* (2013.01); *B01L 2300/0816* (2013.01); *B01L 2300/0867* (2013.01); *B01L 2300/0887* (2013.01); *B01L 2300/123* (2013.01); *B01L 2400/0478* (2013.01); *B01L 2400/0487* (2013.01); *B01L 2400/0655* (2013.01); *F16K 2099/008* (2013.01); *F16K 2099/0084* (2013.01)

(56) References Cited

U.S. PATENT DOCUMENTS

| | | | | |
|---|---|---|---|---|
| 2003/0138829 | A1* | 7/2003 | Unger | B01L 3/502707 506/7 |
| 2005/0019792 | A1* | 1/2005 | McBride | B01L 3/502707 435/6.19 |
| 2005/0221271 | A1* | 10/2005 | Murphy | B01L 3/502761 435/4 |
| 2005/0221373 | A1* | 10/2005 | Enzelberger | B01F 5/102 435/6.19 |
| 2009/0148933 | A1* | 6/2009 | Battrell | B01F 11/0071 435/287.2 |
| 2010/0230613 | A1 | 9/2010 | Pieprzyk et al. | |
| 2011/0005932 | A1* | 1/2011 | Jovanovich | G01N 35/00029 204/453 |
| 2011/0150702 | A1 | 6/2011 | Kim et al. | |

FOREIGN PATENT DOCUMENTS

| | | |
|---|---|---|
| WO | WO-2008/002483 | 1/2008 |
| WO | 2010/097740 A1 | 9/2010 |
| WO | 2011/127908 A1 | 10/2011 |

OTHER PUBLICATIONS

Response to communication pursuant to Rules 161(1) and 162 EPC for EP 13788323.0, filed Jul. 20, 2015, 8 pages.
Supplementary European Search Report for EP 13788232.0, dated Jan. 7, 2016, 7 pages.
Response to Supplementary European Search Report for EP 13788232.0, dated Jul. 22, 2016, 13 pages.
European Patent Office, Office Action for EP application 13788232.0, dated Mar. 16, 2018, 3 pages.
European Patent Office, Response to Office Action for EP application 13788232.0, dated Jul. 26, 2018, 8 pages.
Communication pursuant to Article 94(3) EPC for European patent application EP13 788 232.0, dated Apr. 18, 2019, 4 pages.
Response to the communication pursuant to Article 94(3) EPC for European patent application EP13 788 232.0, dated Oct. 23, 2019, 30 pages.
International Search Report for international patent application PCT/CN2013/000535, dated Aug. 15, 2013, 7 pages.
Written Opinion of the International Search Authority for international patent application PCT/CN2013/000535, dated Aug. 15, 2013, 5 pages.
International Preliminary Report on Patentability for international patent application PCT/CN2013/000535, dated Nov. 11, 2014, 6 pages.

\* cited by examiner

MICROFLUIDIC DEVICES FOR MULTI-INDEX BIOCHEMICAL DETECTION

PRIORITY

The present application is a U.S. national stage application of International Patent Application No. PCT/CN2013/000535, filed May 7, 2013, published Nov. 14, 2013 as WO 2013/166857 A1, and claims the priority benefit to Chinese Application No. 201210142337.7, filed on May 7, 2012, Chinese Application No. 201210142342.8, filed on May 7, 2012, and Chinese Application No. 201210138794.9, filed May 7, 2012, the contents of which are incorporated by reference herein in their entireties for all purposes.

TECHNICAL FIELD

The present invention relates to a microfluidic device, e.g., an integrated microfluidic device, and uses thereof, particularly a microfluidic device for conducting multi-index biochemical detection.

BACKGROUND ART

Biochemical analysis technologies provide important information for disease diagnosis, and many kinds of automatic biochemistry analyzers have been produced to satisfy the growing needs for bioassays in medical testing organizations. Large-scale biochemistry analyzers enable high-throughput and fully-automated analysis, but only can be used in specialized clinical laboratories and operated by highly trained staff, due to their large volume and complicated operation and maintenance. Portable biochemistry analyzers combined with a single-use microchip can meet the need for rapid, on-site and real-time detection, which is very important for emergency medical, primary care, home healthcare, field diagnosis, and has been carried out widely in developed economies.

Microfluidic chip (lab-on-chip) is a multi-disciplinary technology, which adopted microfabrication technology to miniaturize the traditional laboratory into chips and provided platforms for conducting chemical and biological experiments. Due to the advantages such as miniaturization, integration, automation, high-throughput, fast-analysis and low sample consumption, microfluidic chips have become a powerful tool for drugs screening, clinical diagnostics and environmental monitoring. Recently, microfluidic chips have been used for enzyme reactions, immunological reactions, PCR and ELISA assays, which means that on-site, rapid, multi-index, high-throughput, low-cost biochemical assays could be achieved easily.

SUMMARY OF THE INVENTION

In one aspect, the present invention provides a microfluidic device for multiple reactions, which microfluidic device comprises a reaction channel comprising multiple reaction chambers connected to a closed chamber, wherein a wall of the closed chamber is an elastic membrane; and a control channel comprising an elastic side wall, wherein the intersections between the side wall of the control channel with the reaction channel form multiple pneumatic microvalves.

Further provided herein as a micro-fluidic device for multiple reactions, comprising: a reaction channel comprising multiple reaction chambers connected to an elastic balloon outside of the microfluidic device; and a control channel comprising an elastic side wall, wherein the intersections between the side wall of the control channel with the reaction channel form multiple pneumatic microvalves.

In some embodiments, the reaction channel may comprise an inlet. In some embodiments, the elastic membrane may be exposed to the outside environment. In some embodiments, the control channel may comprise a closed end, and an elastic end or an open end exposed to the outside environment. In some embodiments, the reaction chambers may comprise immobilized reaction reagents. In some embodiments, the reaction chambers may be arranged serially or in parallel. In some embodiments, the elastic material may be PDMS (Polydimethylsiloxane), silicon rubber, memory alloy, or PTFE (polytetrafluoroethylene). In some embodiments, the control channel may be connected to a syringe or a high-pressure cylinder.

In another aspect, the present invention provides a method for conducting multiple reactions using the microfluidic device disclosed herein, comprising: a) filling the reaction chambers with a sample; and; b) applying pressure to the control channel to expand the elastic side wall of the control channel, wherein the expanded elastic side wall forms a pneumatic microvalve that separates the reaction chambers.

In some embodiments, step a) may comprise applying pressure to the elastic membrane of the closed chamber or squeezing the elastic balloon outside of the microfluidic device. In some embodiments, step b) may comprise applying pressure to the elastic end of the control channel or applying pressurized gas to the open end of the control channel. In some embodiments, the sample may be a biological sample.

DETAILED DESCRIPTION OF THE INVENTION

Figure 1:
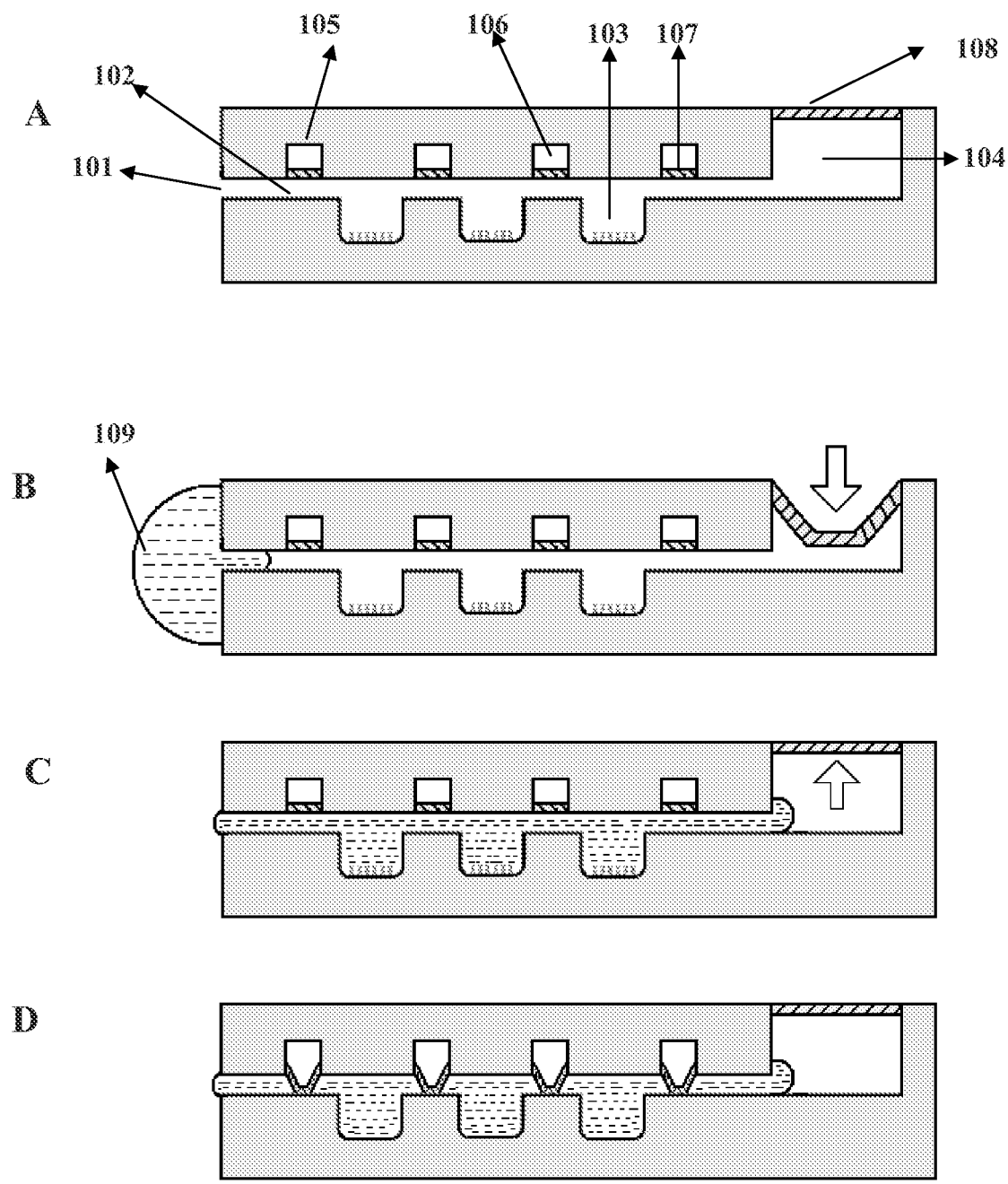
FIG. 1 is a diagram schematically showing a cross-sectional view of one embodiment of the microfluidic chip.

It is a primary object of the present invention to provide a microfluidic device for multi-index biochemical detection, with integrated microchannels, reaction chambers and pneumatic microvalves.

A. GENERAL TECHNIQUES

The practice of the present invention will employ, unless otherwise indicated, conventional techniques of molecular biology (including recombinant techniques), microbiology, cell biology, biochemistry, immunology, and pharmacology, which are within the skill of the art. Such techniques are explained fully in the literature, such as, *Molecular Cloning: A Laboratory Manual,* $2^{nd}$ ed. (Sambrook et al., 1989); *Oligonucleotide Synthesis* (M. J. Gait, ed., 1984); *Animal Cell Culture* (R. I. Freshney, ed., 1987); *Methods in Enzymology* (Academic Press, Inc.); *Current Protocols in Molecular Biology* (F. M. Ausubel et al., eds., 1987, and periodic updates); *PCR: The Polymerase Chain Reaction* (Mullis et al., eds., 1994); and Remington, *The Science and Practice of Pharmacy*, 20th ed., (Lippincott, Williams & Wilkins 2003).

B. DEFINITIONS

Unless defined otherwise, all technical and scientific terms used herein have the same meaning as is commonly understood by one of ordinary skill in the art to which this invention belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, the singular forms "a", "an", and "the" include plural references unless indicated otherwise. For example, "a" dimer includes one or more dimers.

As used herein, the term "microfluidic device" generally refers to a device through which materials, particularly fluid borne materials, such as liquids, can be transported, in some embodiments on a micro-scale, and in some embodiments on a nanoscale. Thus, the microfluidic devices described by the presently disclosed subject matter can comprise microscale features, nanoscale features, and combinations thereof.

Accordingly, an exemplary microfluidic device typically comprises structural or functional features dimensioned on the order of a millimeter-scale or less, which are capable of manipulating a fluid at a flow rate on the order of a μL/min or less. Typically, such features include, but are not limited to channels, fluid reservoirs, reaction chambers, mixing chambers, and separation regions. In some examples, the channels include at least one cross-sectional dimension that is in a range of from about 0.1 μm to about 500 μm. The use of dimensions on this order allows the incorporation of a greater number of channels in a smaller area, and utilizes smaller volumes of fluids.

A microfluidic device can exist alone or can be a part of a microfluidic system which, for example and without limitation, can include: pumps for introducing fluids, e.g., samples, reagents, buffers and the like, into the system and/or through the system; detection equipment or systems; data storage systems; and control systems for controlling fluid transport and/or direction within the device, monitoring and controlling environmental conditions to which ft ids in the device are subjected, e.g., temperature, current, and the like.

As used herein, the terms "channel," "micro-channel," "fluidic channel," and "microfluidic channel" are used interchangeably and can mean a recess or cavity formed in a material by imparting a pattern from a patterned substrate into a material or by any suitable material removing technique, or can mean a recess or cavity in combination with any suitable fluid-conducting structure mounted in the recess or cavity, such as a tube, capillary, or the like. In the present invention, channel size means the cross-sectional area of the microfluidic channel.

As used herein, the terms "flow channel" and "control channel" are used interchangeably and can mean a channel in a microfluidic device in which a material, such as a fluid, e.g., a gas or a liquid, can flow through. More particularly, the term "flow channel" refers to a channel in which a material of interest, e.g., a solvent or a chemical reagent, can flow through. Further, the term "control channel" refers to a flow channel in which a material, such as a fluid, e.g., a gas or a liquid, can flow through in such a way to actuate a valve or pump.

As used herein, "chip" refers to a solid substrate with a plurality of one-, two- or three-dimensional micro structures or micro-scale structures on which certain processes, such as physical, chemical, biological, biophysical or biochemical processes, etc., can be carried out. The micro structures or micro-scale structures such as, channels and wells, electrode elements, electromagnetic elements, are incorporated into, fabricated on or otherwise attached to the substrate for facilitating physical, biophysical, biological, biochemical, chemical reactions or processes on the chip. The chip may be thin in one dimension and may have various shapes in other dimensions, for example, a rectangle, a circle, an ellipse, or other irregular shapes. The size of the major surface of chips of the present invention can vary considerably, e.g., from about 1 $mm^2$ to about 0.25 $m^2$. Preferably, the size of the chips is from about 4 $mm^2$ to about 25 $cm^2$ with a characteristic dimension from about 1 mm to about 5 cm. The chip surfaces may be flat, or not flat. The chips with non-flat surfaces may include channels or wells fabricated on the surfaces.

A microfluidic chip can be made from any suitable materials, such as PDMS (Polydimethylsiloxane), glass, PMMA (polymethylmethacrylate), PET (polyethylene terephthalate), PC (Polycarbonate), etc., or a combination thereof.

As used herein, "biological sample" refers to any sample obtained from a living or viral source or other source of macromolecules and biomolecules, and includes any cell type or tissue of a subject from which nucleic acid or protein or other macromolecule can be obtained. The biological sample can be a sample obtained directly from a biological source or a sample that is processed. For example, isolated nucleic acids that are amplified constitute a biological sample. Biological samples include, but are not limited to, body fluids, such as blood, plasma, serum, cerebrospinal fluid, synovial fluid, urine and sweat, tissue and organ samples from animals and plants and processed samples derived therefrom.

It is understood that aspects and embodiments of the invention described herein include "consisting" and/or "consisting essentially of" aspects and embodiments.

Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Other objects, advantages and features of the present invention will become apparent from the following specification taken in conjunction with the accompanying drawings.

C. MICROFLUIDIC DEVICE AND MICROFLUIDIC SYSTEM

To achieve the above mentioned objective, the present invention provides a microfluidic device for multiple reactions, which microfluidic device comprises a reaction channel comprising multiple reaction chambers connected to a closed chamber, wherein a wall of the closed chamber is an elastic membrane; and a control channel comprising an elastic side wall, wherein the intersections between the side wall of the control channel with the reaction channel form multiple pneumatic microvalves.

Further provided herein as a microfluidic device for multiple reactions, comprising: a reaction channel comprising multiple reaction chambers connected to an elastic balloon outside of the microfluidic device; and a control channel comprising an elastic side wall, wherein the intersections between the side wall of the control channel with the reaction channel form multiple pneumatic microvalves.

The reaction channel may include two ends, one connecting with an inlet, and the other one connecting with a closed chamber integrated within the microfluidic device. The top wall of the closed chamber may be an elastic membrane, which is exposed to the outside environment.

The reaction chambers may be linked by the reaction channel, in parallel or serially, or both. In some embodiments, the micro-fluidic device may include at least 2, at least 3, at least 4, at least 5, at least 6, at least 7, at least 8, at least 9, at least 10, at least 20, at least 50, at least 100 or more reaction chambers. In some embodiments, the reaction chambers may be linked by more than one reaction channels. The reaction channels may be arranged in any suitable pattern on the microfluidic device, for example, in parallel.

In some embodiments, each reaction chamber may be connected to one reaction channel. In some embodiments, each reaction chamber may be connected to two or more reaction channels. In embodiments wherein each reaction chamber is connected to more than one reaction channels, each reaction channel may be used for a different sample, a different reagent, or a different combination of a sample and another reagent, such as a reaction buffer, a washing solution, or the like. In embodiments wherein more than one reaction channels are included in a microfluidic device, some or all of the reaction channels may be connected to a single closed chamber or an elastic balloon, or each reaction channel maybe connected to a separate closed chamber or an elastic balloon.

The reaction chambers may include reagents which are needed by the multiple biochemical assays, for example, enzymes and/or substrates for enzymatic reactions, antigens and/or antibodies for ELISA assays, PCR primers and/or templates, oligonucleotide probes for hybridization, or the like. Further, the reagents may be labeled, for example, with fluorescent labels, for detection of the reaction products. In some embodiments, the reagents, such as enzymes, substrates, antigens, antibodies, primers, templates, oligonucleotides, may be immobilized in the reaction chambers. In some embodiments, the reagents may be dried, for example, freeze dried, passivated with paraffin, absorbed on a porous material, or the like. The reagents may be immobilized by means of physical adsorption, chemical crosslinking, sol-gel-embedded, microbeads-immobilization or membrane-immobilization. In some embodiments, the reagents may be formed as a slow-release format.

The different reaction chambers may include the same reagents, or preferably, they may include different reagents. In some embodiments, the different reaction chambers may include the same amount of one reagent, and different amounts of another reagent. In some embodiments, the different reaction chambers may include a serial titration of one reagent. In some embodiments, the reaction chambers comprising a serial titration of one reagent may be arranged in a certain pattern, such as on the same line, or connected by the same reaction channel, or the like.

A pneumatic microvalve may be formed at the intersection between the control channel and the reaction channel. In some embodiments, a microfluidic device may include one pneumatic microvalve at an intersection between the control channel and the reaction channel. In some embodiments, more than one pneumatic microvalves may be formed between the reaction channel and the control channel at multiple intersections. The pneumatic microvalve may be controlled by the control channel, and one side-wall of the control channel is an elastic membrane. One end of the control channel may be closed, and the other one may be connected to a closed chamber with an elastic membrane, or to the outside environment. To activate the pneumatic microvalves, the open end of the control channel may be connected to a pressure source, such as a pump, a syringe, a high-pressure cylinder; or pressure may be applied to the elastic membrane of the closed chamber, to apply pressure to the elastic membrane of the side-wall of the control channel. In certain embodiments, the control channel may include an inert gas or liquid.

The control channel and the reaction channel may intersect, and the elastic membrane is the shared wall of the intersecting channels, and functions as the pneumatic microvalve. In some embodiments, the control channel and the reaction channel are arranged in a pattern such that the intersections form pneumatic microvalves at both sides of a reaction chamber. In some embodiments, more than one control channel may be included in the microfluidic device. For example, in embodiments wherein more than one reaction channels are included in the microfluidic device, one or more control channels may be included that intersect with the reaction channels to form pneumatic microvalves with each of the reaction channels. Preferably, a pneumatic microvalve may be formed on each side of the reaction chamber for one reaction channel that is connected to the reaction chamber. In embodiments wherein more than one control channel are included in the microfluidic device, each of the control channels may be operated together or separately. For example, some of the control channels may be pressurized while others are released of the pressure. In certain embodiments, operating the control channels separately may enable a sample and/or reagent to be added to some reaction chambers but not others.

Any suitable materials may be used for the elastic membrane. For example, the materials of the elastic membrane can be PDMS, silicon rubber, memory alloy, or PTFE (polytetrafluoroethylene), etc., or a combination thereof. The thickness of the elastic membrane may be 0~300 µm. In some embodiments, the elastic membrane that forms the side wall of the control channel may be reversibly expanded. For example, when the elastic membrane expands under pressure within the control channel, the pneumatic microvalves formed at the intersection of the control channel and the reaction channel are closed; when the elastic membrane retracts when the pressure within the control channel is released, the pneumatic microvalves formed at the intersection of the control channel and the reaction channel are opened. In some other embodiments, the elastic membrane that forms the side wall of the control channel may be irreversibly expanded. For example, once the pneumatic microvalves formed at the intersections of the control channel and the reaction channel are closed under pressure within the control channel, they cannot open even when the pressure within the control channel is later released. The reversibility of the pneumatic microvalves may depend on the elastic material that is used for the elastic membrane. For example, when memory alloy is used, the pneumatic microvalves may be irreversibly expanded.

Exemplary microfluidic devices may comprise a central body structure in which various microfluidic elements are disposed. The body structure includes an exterior portion or surface, as well as an interior portion which defines the various microscale channels and/or chambers of the overall microfluidic device. For example, the body structure of an exemplary microfluidic devices typically employs a solid or semi-solid substrate that may be planar in structure, i.e., substantially flat or having at least one flat surface. Suitable substrates may be fabricated from any one of a variety of materials, or combinations of materials. Often, the planar substrates are manufactured using solid substrates common in the fields of microfabrication, e.g., silica-based substrates, such as glass, quartz, silicon or polysilicon, as well as other known substrates, i.e., gallium arsenide. In the case of these substrates, common microfabrication techniques, such as photolithographic techniques, wet chemical etching, micromachining, i.e., drilling, milling and the like, may be readily applied in the fabrication of microfluidic devices and substrates. Alternatively, polymeric substrate materials may be used to fabricate the devices of the present invention, including, e.g., polydimethylsiloxanes (PDMS), polymethylmethacrylate (PMMA), polyurethane, polyvinylchloride (PVC), polystyrene, polysulfone, polycarbonate and the like. In the case of such polymeric materials, injection molding or embossing methods may be used to form the substrates having the channel and reservoir geometries as described herein. In such cases, original molds may be fabricated using any of the above described materials and methods.

The channels and chambers of an exemplary device are typically fabricated into one surface of a planar substrate, as grooves, wells or depressions in that surface. A second planar substrate, typically prepared from the same or similar material, is overlaid and bound to the first, thereby defining and sealing the channels and/or chambers of the device. Together, the upper surface of the first substrate, and the lower mated surface of the upper substrate, define the interior portion of the device, i.e., defining the channels and chambers of the device. In some embodiments, the upper layer may be reversibly bound to the lower layer.

D. METHODS FOR CONDUCTING MULTI-INDEX DETECTION

In another aspect, the present invention provides a method for conducting multiple reactions using the microfluidic device disclosed herein, comprising: a) filling the reaction chambers with a sample; and; b) applying pressure to the control channel to expand the elastic side wall of the control channel, wherein the expanded elastic side wall forms a pneumatic microvalve that separates the reaction chambers.

In some embodiments, the method may further include a step to fill the reaction chambers with another sample and/or a reagent. The additional sample and/or reagent may be introduced from the same reaction channel, or a different reaction channel, for example, in embodiments wherein a reaction chamber is connected to more than one reaction channels. In embodiments wherein more than one sample or reagent is introduced into the reaction chambers, the sample and/or reagent may be introduced simultaneously or sequentially.

In certain embodiments, the method may further include a step to remove the samples and/or reagents after the reactions have been completed, and/or a step to wash away residue samples and/or reagents before the reaction products can be detected. Removing the samples and/or reagents after the reaction have been completed may be done by, for example, releasing the pressure within the control channel to open the pneumatic microvalves formed at the intersections of the control channel and the reaction channel, depressing the elastic membrane of the closed chamber or squeezing the elastic balloon connected to the reaction channel so that the samples and/or reagents are forced out of the inlet of the reactions channel. Washing away residue samples and/or reagents may be done by, for example, following removing the samples and/or reagents, depressing the elastic membrane of the closed chamber or squeezing the elastic balloon connected to the reaction channel and placing the inlet of the reaction channel in a washing buffer or solution, releasing the elastic membrane of the closed chamber or releasing the elastic balloon connected to the reaction channel, so that the washing buffer or solution fills the reaction channel and the reaction chambers. The washing step may be repeated multiple times until no residual samples and/or reagents remain in the reaction channel or reaction chambers.

In some embodiments, the invention may integrate sample injection, multi-index biochemical reaction and detection into a microfluidic platform, which simplifies the operation process and reduce consumption of reagents significantly. This integrated platform has a foreseeable high economic value, which makes low-cost on-site and real-time biochemical detections possible.

E. EXAMPLES

The following examples are offered to illustrate but not to limit the invention.

Example 1

Exemplary Microfluidic Device

As shown in Figure an exemplary microfluidic chip consists of microchannel 102, three reservoirs 103 and pneumatic valves 105. One side of the microchannel connects with sampling inlet 101, and another side connects with chamber 104 incorporated on the microchip. A sidewall of the chamber 104 is made of an elastic membrane 108, fabricated by PDMS and having a thickness of 200 μm, exposed to the outside environment. The control channel 106 includes a closed end (not shown in FIG. 1) and an open end (not shown in FIG. 1), wherein the open end extends outside of the microfluidic chip. Three reservoirs 103, which include immobilized enzymes and substrates, are connected serially by microchannel 102. The pneumatic micro-valve 105 consists of a controllable channel 106 and an elastic membrane 107, the controllable channel 106 and the microchannel 102 intersect, and the side-wall of elastic membrane 107 is the shared wall of the intersected channels. A microvalve 105 is located on each side of the reservoir 103.

When the microfluidic chip is used for conducting an assay, as shown in FIG. 1b, the elastic membrane 108 of chamber 104 is depressed, and the inlet 101 is immersed into a sample solution 109. As shown in FIG. 1(c), when the pressure on the elastic membrane 108 is removed, a negative pressure is produced due to the restore of elastic membrane 108, and the sample solution 109 will enter and fill with all reservoirs 103 along the microchannel 102. At the same time, the pneumatic valves 105 are formed by applying a pressure to the controllable channel 106, so that the reservoirs are separated to independent reaction chambers for biochemical reactions independently (FIG. 1(d)).

Example 2

Exemplary Microfluidic Chip for Nine-Index Detection

Figure 2:
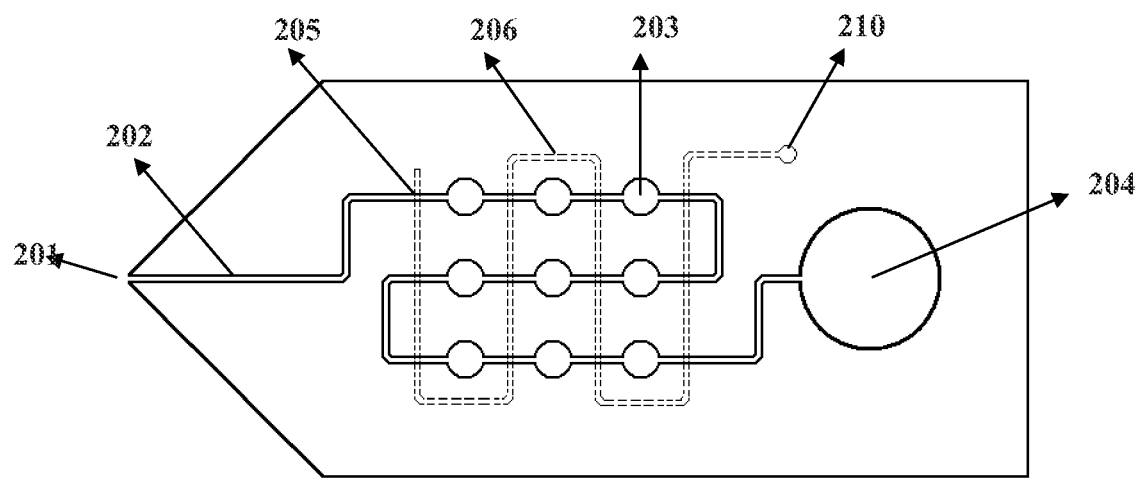
FIG. 2 is a diagram schematically showing a top view of one embodiment of the microfluidic chip for nine-index biochemical detection.

As shown in FIG. 2, an exemplary microfluidic chip for nine-index detection consists of microchannel 202, nine reservoirs 203 and pneumatic valves 205. One end of the microchannel 202 connects with sampling inlet 201, and another end connects with chamber 204 incorporated within the microchip. A side-wall of the chamber 204 is made of an elastic membrane 208 (not shown in FIG. 2 for clarity), fabricated by silicone rubber and having a thickness of 200 µm, exposed to the outside environment. Nine reservoirs 203, which include immobilized enzymes and substrates (as illustrated in FIG. 1a), are connected serially by the microchannel 202. The pneumatic micro-valve consists of a controllable channel 206 and an elastic membrane 207, the controllable channel 206 and the microchannel 202 intersect, and the side-wall of elastic membrane 207 is the shared wall of the intersecting channels. A pneumatic valve 205 is located on both sides of each reservoir 203.

When sampling, the elastic membrane 208 of chamber 204 is depressed, and the inlet 201 is immersed into a sample solution. When the pressure is removed, the sample solution will enter and fill with nine reservoirs 203 along the microchannel 202. At the same time, the pneumatic valves 205 are started by applying pressure to the controllable channel 206, so that the reservoirs 203 are separated into independent reaction chambers for accomplish of biochemical reactions respectively.

The pneumatic valves 205 can also be controlled by a high pressured gas connected with the open end of the control channel 206, which can provide working pressure for numerous pneumatic valves 205 at the same time, and enable this microchip for high-throughput biochemical detections.

Example 3

Exemplary Microfluidic Chip With a Balloon

Figure 3:
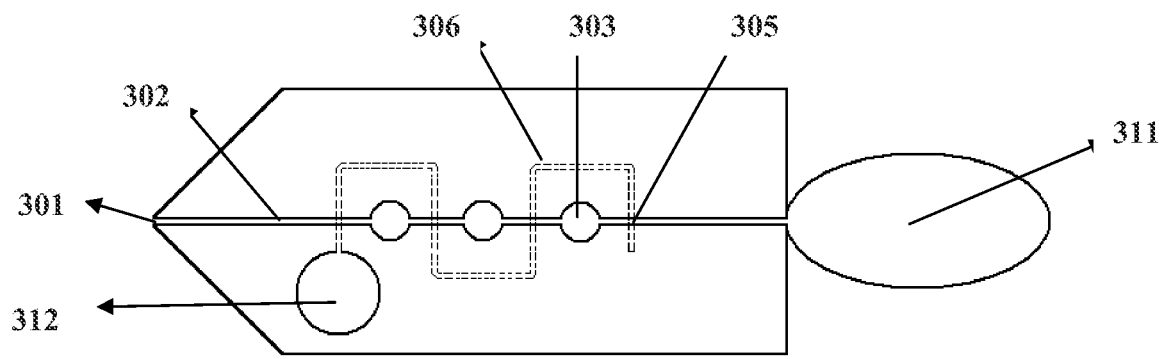
FIG. 3 is a diagram schematically showing a top view of one embodiment of the microfluidic chip for three-index biochemical detection.

As shown in FIG. 3, an exemplary microfluidic chip for three-index detection consists of microchannel 302, three reservoirs 303 and pneumatic valves 305. One side of the microchannel 302 connects with the sampling inlet 301, and the other side connects a PDMS based sampling balloon 311 that is located outside the microchip. Three reservoirs 303, which include immobilized enzymes and substrates, are connected serially by microchannel 302. The pneumatic micro-valves 305 are formed by a controllable channel 306 and an elastic membrane 307 that is made from silicon rubber with a thickness of 300 µm. The controllable channel 306 and the microchannel 302 intersect, and the side-wall of elastic membrane 307 is the shared wall of the intersected channels. The pneumatic valves 305 are located on both sides of each reservoir 303.

When sampling, the elastic balloon 311 is depressed, and the sample inlet 301 is immersed into sample solution. When the pressure is removed, the sample solution will enter and fill with three reservoirs 303 along the microchannel 302. At the same time, the pneumatic valves 305 are started by applying pressure to controllable channel 306 by pressing the elastic membrane of chamber 312, so that the reservoirs 303 are separated into independent reaction chambers for biochemical reactions respectively.

The use of a balloon located outside of the microfluidic chip provides a greater negative pressure for sucking in the sample solution, thus enables the microchip for biochemical detection using sample solutions with greater viscosity.

Example 4

Exemplary Microfluidic Chip With Integrated Closed Chamber and Control Channel

Figure 4:
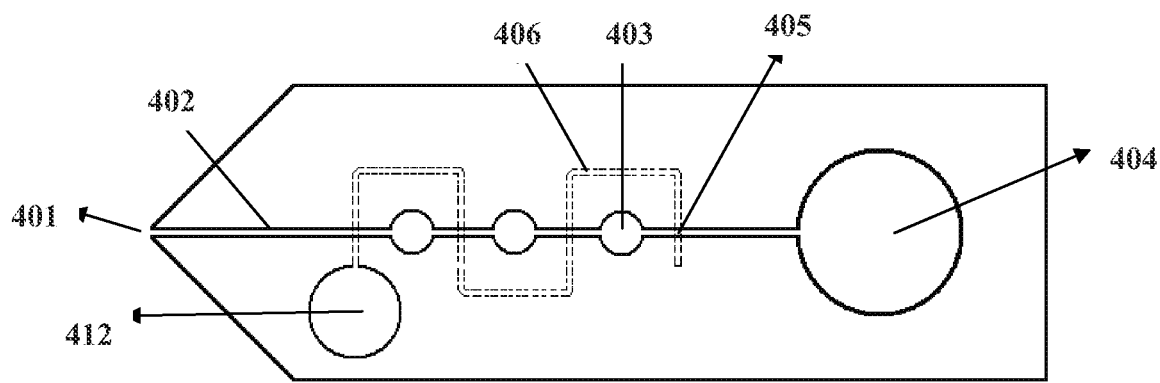
FIG. 4 is a diagram schematically showing a top view of another embodiment of the microfluidic chip for three-index biochemical detection.

As shown in FIG. 4, an exemplary integrated microchip for three-index detection consists of microchannel 402, three reservoirs 403 and pneumatic valves 405. One end of the microchannel 402 connects with sampling inlet 401, and the other end connects a PDMS based sampling chamber 404 integrated with the microchip. One side-wall of chamber 404 is an elastic membrane 408 exposed to the outside environment, with a thickness of 100 µm. Three reservoirs 403, which include immobilized enzymes and substrates, are connected serially by microchannel 402. The pneumatic micro-valve 405 consists of a controllable channel 406 and an elastic membrane 407 that is made from silicon rubber with a thickness of 100 µm. One end of the controllable channel 406 is closed and the other end is connected to a chamber 412 with an elastic membrane that is made from silicon rubber with a thickness of 100 µm and exposed to the outside environment. The controllable channel 406 and the microchannel 402 intersect, and the side-wall of elastic membrane 407 is the shared wall of the intersecting channels. The pneumatic valves 405 are located on both sides of each reservoir.

When sampling, the elastic membrane 407 of chamber 404 is depressed, and the inlet 401 is immersed into a sample solution. When the pressure is removed, the sample solution will enter and fill with three reservoirs 403 along the microchannel 402. At the same time, the pneumatic valves are started by applying pressure to controllable channel 406 by pressing the elastic membrane of chamber 412, so that the reservoirs are separated into independent reaction chambers for biochemical reactions respectively.

Using the chamber with an elastic membrane integrated in the microfluidic chip for sampling and control of pneumatic valves, multi-index biochemical detection can be easily achieved by pressing the elastic membrane of the chamber 412, so this microchip is suitable for point-of-care detection.

The above examples are included for illustrative purposes only and are not intended to limit the scope of the invention, Many variations to those described above are possible. Since modifications and variations to the examples described above will be apparent to those of skill in this art, it is intended that this invention be limited only by the scope of the appended claims.

We claim:
1. A microfluidic device for multiple reactions, comprising:
a) a reaction channel comprising multiple reaction chambers arranged serially along the reaction channel, which reaction channel is connected to a closed chamber, wherein a wall of the closed chamber is an elastic membrane exposed to the outside environment, and the elastic membrane is depressible to control liquid flow in the reaction channel; and wherein the reaction chambers have reagents immobilized therein; and b) a control channel comprising an elastic side wall,
wherein the control channel and the reaction channel intersect, and the elastic side wall of the control channel is shared with the reaction channel and forms a pneumatic microvalve where the control channel and the reaction channel intersect;
and each reaction chamber is controlled by two pneumatic microvalves, one on each side of the reaction chamber.

2. The microfluidic device of claim 1, wherein the reaction channel comprises an inlet.

3. The microfluidic device of claim 1, wherein the control channel comprises a closed end, an elastic end, or an open end exposed to the outside environment.

4. The microfluidic device of claim 1, wherein the immobilized reaction reagents are selected from enzymes, substrates, antigens, antibodies, primers, templates, and oligonucleotides.

5. The microfluidic device of claim 1, wherein the elastic material is PDMS (Polydimethylsiloxane), silicon rubber, memory alloy, or PTFE (polytetrafluoroethylene).

6. The microfluidic device of claim 1, wherein the control channel is connected to a syringe or a high-pressure cylinder.

7. The microfluidic device of claim 1, which comprises more than one reaction channels.

8. The microfluidic device of claim 7, wherein the multiple reaction chambers are linked by the more than one reaction channels.

9. The microfluidic device of claim 1, which comprises more than one control channels.

10. A microfluidic device for multiple reactions, comprising:
a) a reaction channel comprising multiple reaction chambers arranged serially along the reaction channel, which reaction channel on one end is connected to an elastic balloon outside of the microfluidic device, wherein the reaction channel comprises an inlet on the other end;
wherein the reaction chambers have reagents immobilized therein; and
b) a control channel comprising an elastic side wall,
wherein the control channel and the reaction channel intersect, and the elastic side wall of the control channel is shared with the reaction channel and forms a pneumatic microvalve where the control channel and the reaction channel intersect;
and each reaction chamber is controlled by two pneumatic microvalves, one on each side of the reaction chamber.

11. The microfluidic device of claim 10, wherein the control channel comprises a closed end, an elastic end, or an open end exposed to the outside environment.

12. The microfluidic device of claim 10, wherein the reagents are selected from enzymes, substrates, antigens, antibodies, primers, templates, and oligonucleotides.

13. The microfluidic device of claim 10, wherein the elastic material is PDMS (Polydimethylsiloxane), silicon rubber, memory alloy, or PTFE (polytetrafluoroethylene).

14. The microfluidic device of claim 10, which comprises more than one reaction channels.

15. The microfluidic device of claim 14, wherein the multiple reaction chambers are linked by the more than one reaction channels.

16. The microfluidic device of claim 10, which comprises more than one control channels.

17. A method for conducting multiple reactions using the microfluidic device of claim 1, comprising:
a) filling the reaction chambers with a sample; and
b) applying pressure to the control channel to expand the elastic side wall of the control channel,
wherein the expanded elastic side wall forms pneumatic microvalves with the reaction channel, which pneumatic microvalves are capable of separating the reaction chambers.

18. The method of claim 17, wherein step a) comprises applying pressure to the elastic membrane of the closed chamber.

19. The method of claim 17, wherein the control channel comprises an elastic end, and wherein step b) comprises applying pressure to the elastic end of the control channel.

20. The method of claim 17, wherein the control channel comprises an open end exposed to the outside environment, and wherein step b) comprises applying pressurized gas to the open end of the control channel.

21. The method of claim 17, wherein the sample is a biological sample.

22. A method for conducting multiple reactions using the microfluidic device of claim 10, comprising:
a) filling the reaction chambers with a sample; and
b) applying pressure to the control channel to expand the elastic side wall of the control channel,
wherein the expanded elastic side wall forms pneumatic microvalves with the reaction channel, which pneumatic microvalves are capable of separating the reaction chambers.

23. The method of claim 22, wherein step a) comprises squeezing the elastic balloon outside of the microfluidic device.

24. The method of claim 22, wherein the control channel comprises an elastic end, and wherein step b) comprises applying pressure to the elastic end of the control channel.

25. The method of claim 22, wherein the control channel comprises an open end exposed to the outside environment, and wherein step b) comprises applying pressurized gas to the open end of the control channel.

26. The method of claim 22, wherein the sample is a biological sample.

* * * * *